(12) United States Patent
Green et al.

(10) Patent No.: US 7,468,690 B2
(45) Date of Patent: Dec. 23, 2008

(54) METHOD AND SYSTEM FOR CALIBRATING ESA, DISTRIBUTED WAVEFORM GENERATOR AND RECEIVERS IN SUB-ARRAYS

(75) Inventors: Patrick Anthony Green, Glenwood, MD (US); William Blackmore Dixon, Glen Burnie, MD (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 275 days.

(21) Appl. No.: 11/463,655

(22) Filed: Aug. 10, 2006

(65) Prior Publication Data
US 2008/0036648 A1 Feb. 14, 2008

(51) Int. Cl.
*G01S 7/40* (2006.01)
(52) U.S. Cl. ........................ 342/174; 342/175
(58) Field of Classification Search .......... 342/165–174
See application file for complete search history.

(56) References Cited

U.S. PATENT DOCUMENTS

| | | | | |
|---|---|---|---|---|
| 5,027,127 A | * | 6/1991 | Shnitkin et al. | 342/372 |
| 6,339,399 B1 | * | 1/2002 | Andersson et al. | 342/372 |
| 6,690,952 B2 | * | 2/2004 | Nishimori et al. | 455/562.1 |

* cited by examiner

*Primary Examiner*—Thomas H Tarcza
*Assistant Examiner*—Timothy A Brainard
(74) *Attorney, Agent, or Firm*—Alston & Bird LLP

(57) ABSTRACT

A system for calibrating waveform generators and receivers of non-overlapping electronic scanning antennas includes a first sub-array, a second sub-array and a calibration cable. The first sub-array includes a first waveform generator, a first receiver, and a first switch assembly. The second sub-array includes a second waveform generator, a second receiver, and a second switch assembly. The calibration cable is configured to selectably form a common calibration path between the first and second sub-arrays based on a position of the first and second switch assemblies. The first and second switch assemblies are configured to enable calibration of the second receiver using an input from the first waveform generator via the calibration cable.

20 Claims, 12 Drawing Sheets

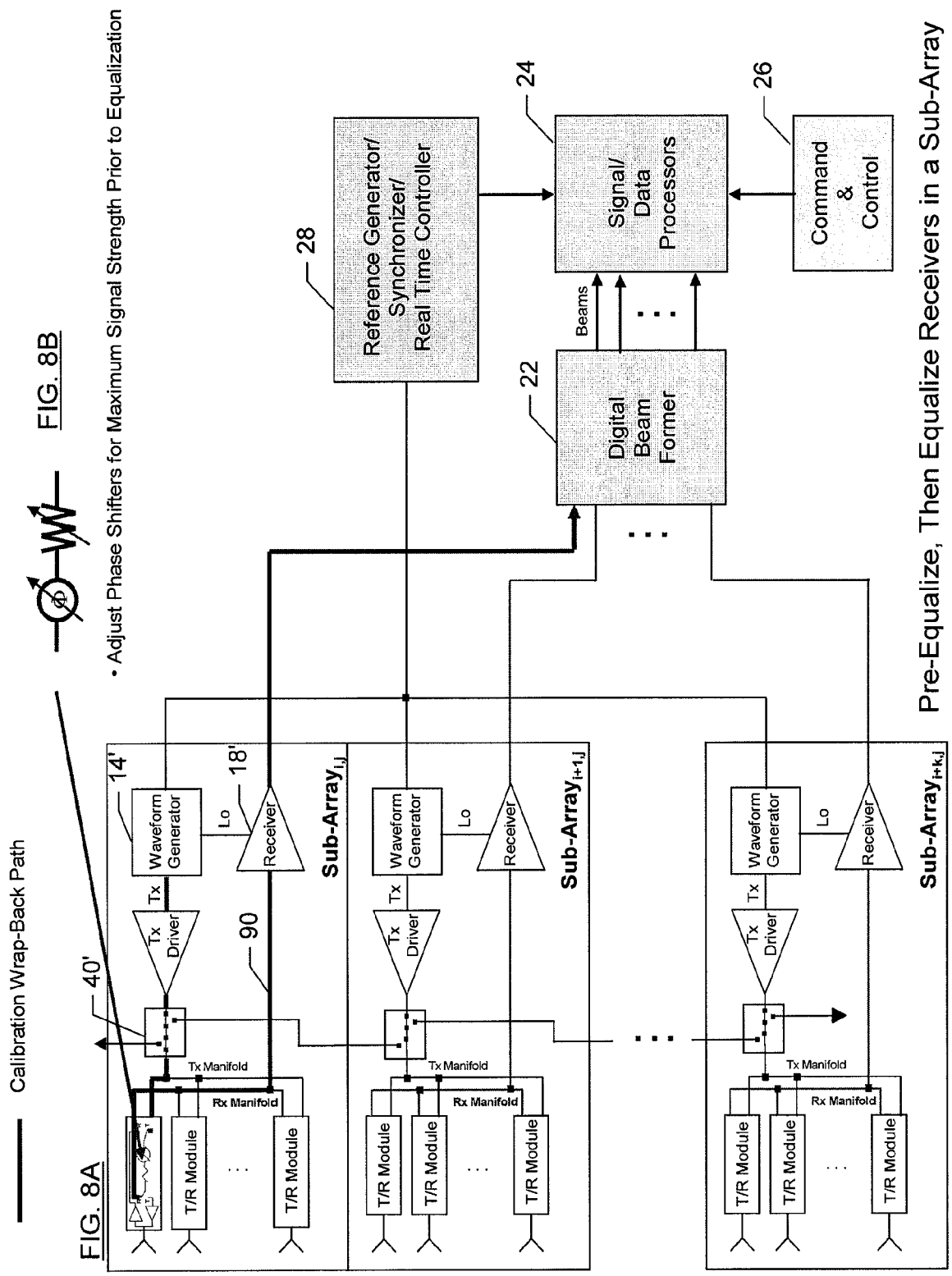

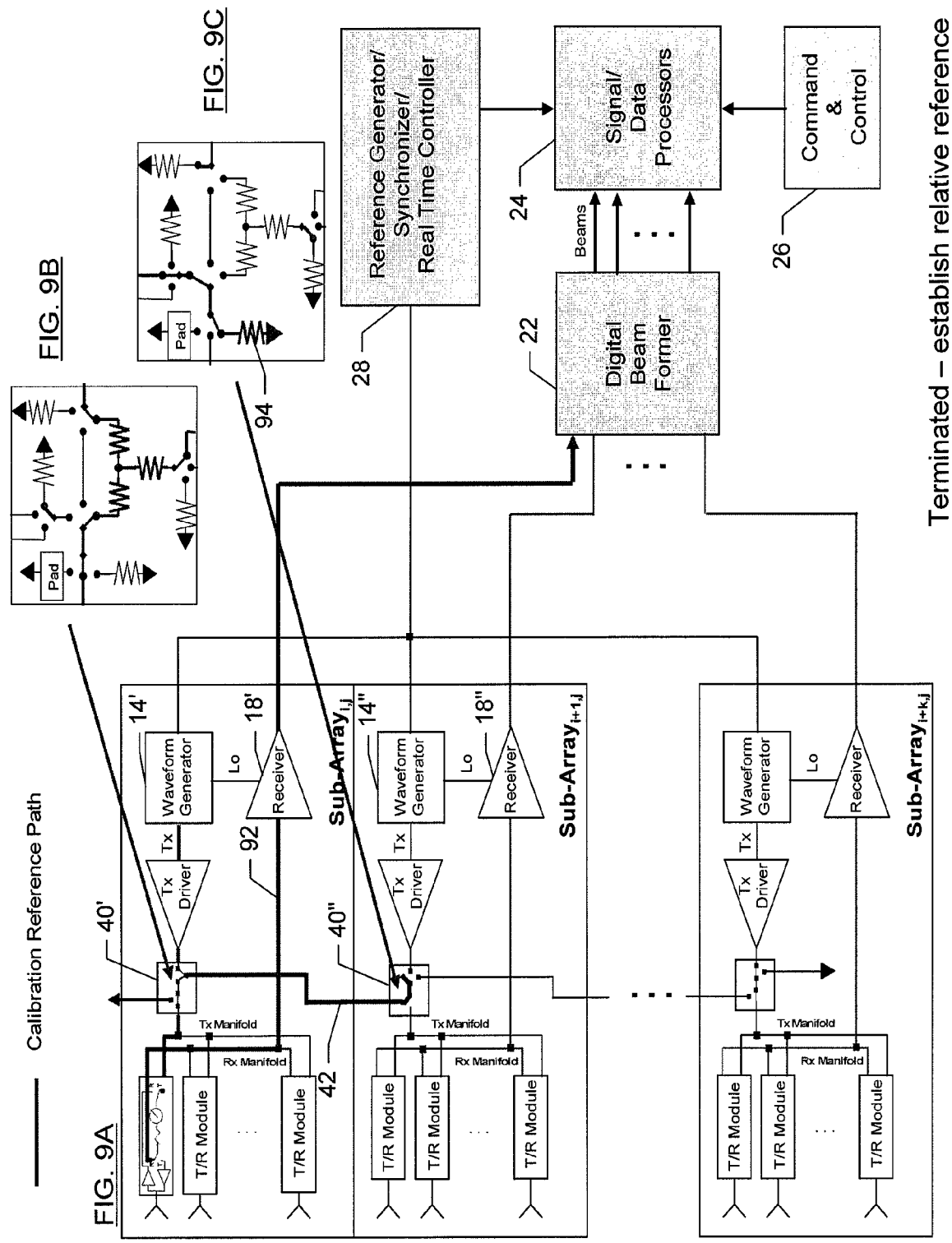

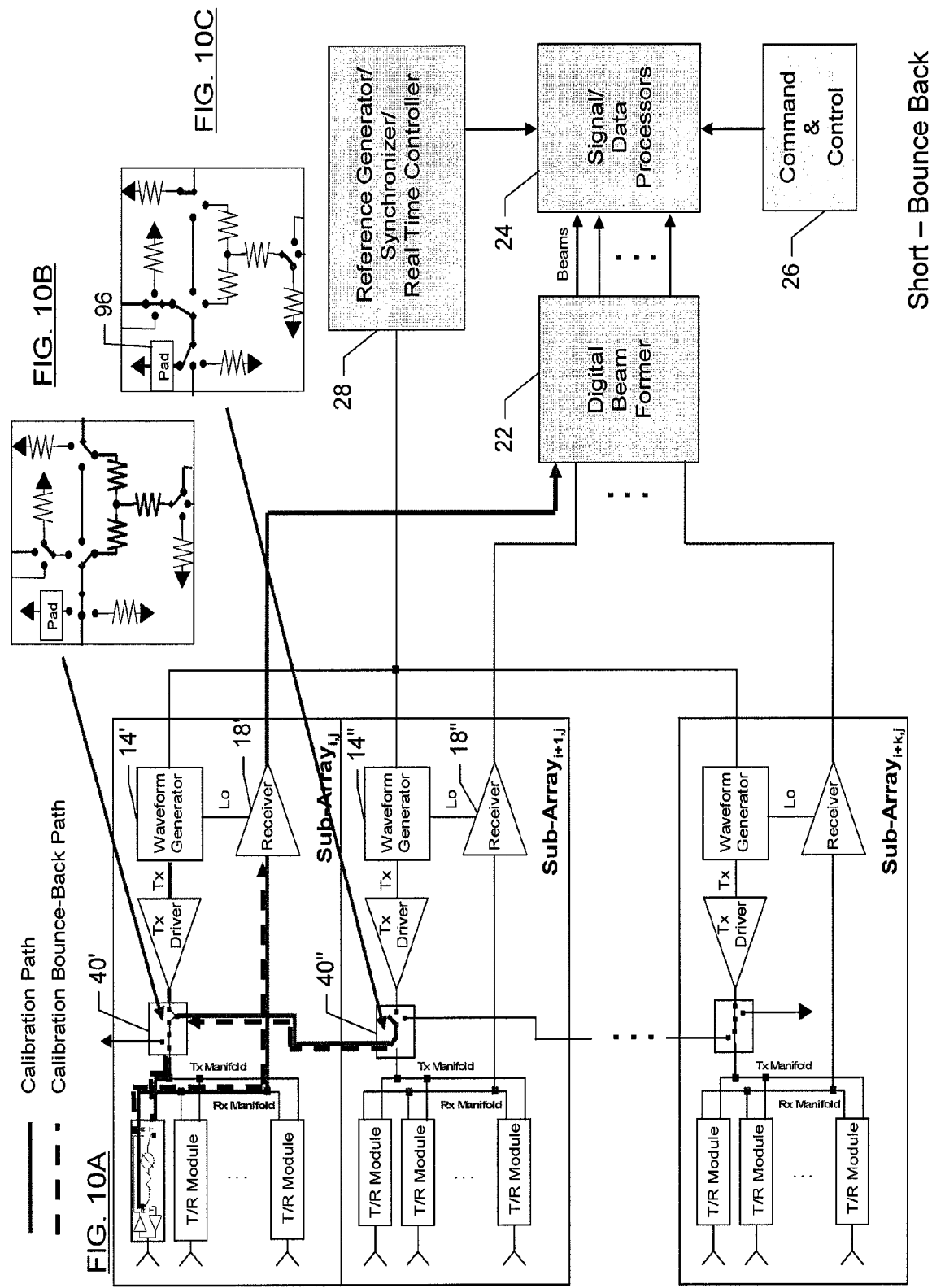

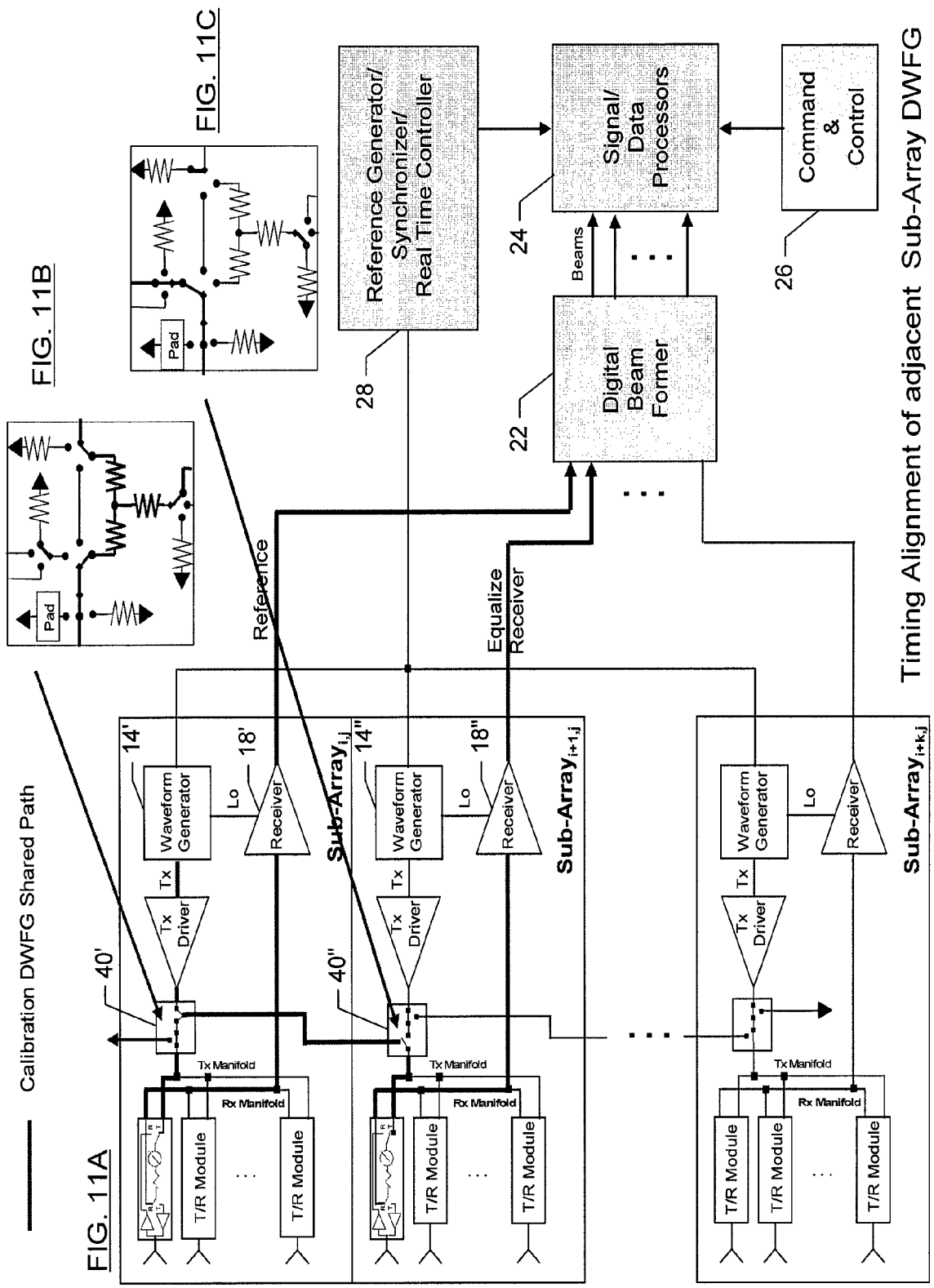

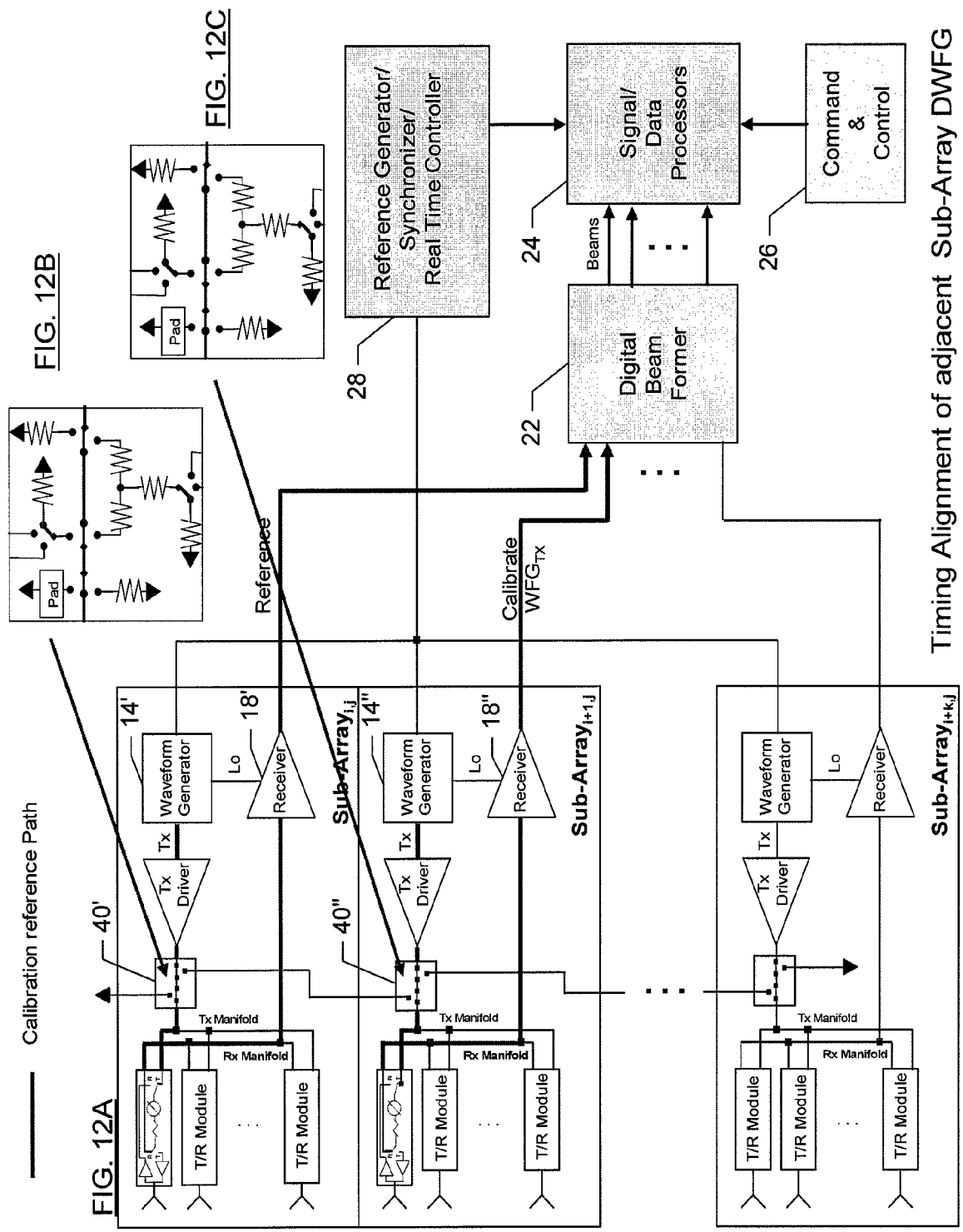

METHOD AND SYSTEM FOR CALIBRATING ESA, DISTRIBUTED WAVEFORM GENERATOR AND RECEIVERS IN SUB-ARRAYS

FIELD OF THE INVENTION

Embodiments of the present invention relate generally to calibration techniques, and more particularly, to calibrating electronic scanning antennas (ESAs), distributed waveform generators and receivers in overlapping or non-overlapping sub-array architectures.

BACKGROUND OF THE INVENTION

Radar has long been employed in applications such as air traffic control, fire control, navigation, etc. Due to the many advantages of radar usage in such applications, radar has also been the subject of continuous improvement efforts. One of the fundamental requirements of many types of radar is the implementation of some form of beam steering in order to conduct a sweep of a particular area in an effort to, for example, detect contacts, targets, navigation aids, etc. Conventional radars typically employed mechanical beam steering methods. For example, a commonly recognized image of a radar antenna is a parabolic antenna mounted on a rotating apparatus which steers the antenna. Such rotating radars often utilize complex mechanical mechanisms such as hydraulics, electric motors or hinge appendages in order to achieve the rotation that provides beam steering. However, mechanical apparatuses such as those listed above often require intensive maintenance in order to ensure optimal performance. Additionally, failure of a single element of rotating radars may render the entire apparatus unusable. Rotating radars also suffered limitations in scanning rates due to the mechanical rotation, which translated into limitations with respect to contact or target detection.

In order to overcome several of the disadvantages of conventional radars, electronic scanning antennas (ESAs) have been developed, which are also known as phased array radars. ESAs are a revolutionary type of radar whose transmitter and receiver functions are composed of numerous small transmit/receive (T/R) modules. ESA radars perform electronic beam steering which can be done without the limitations caused by physical rotation. Accordingly, ESAs feature short to instantaneous (millisecond) scanning rates. Additionally, since ESAs do not rotate, ESA radars have vastly simpler mechanical designs and require no complex hydraulics for antenna movement or hinge appendages that may be prone to failure. The ESA radar also occupies less space than a typical radar because ESAs have reduced infrastructure requirements as compared to rotating radars. The distributed nature of the transmit function in an ESA also eliminates the most common single-point failure mode seen in conventional rotating radars of lost ability to rotate. Given the improvements above, ESA maintenance crews are far less severely taxed, and the ESA radar is much more reliable than a comparable rotating radar. In addition to having much higher scanning rates than conventional radar, ESAs also typically have a much longer target detection range, higher capabilities in terms of the number of targets that can be tracked and engaged (multiple agile beams), low probability of intercept, ability to function as a radio/jammer, simultaneous air and ground modes, etc.

Although ESA radars represent a significant improvement over conventional radars, there is still a desire to improve the capabilities of ESA radars. Improvement among ESA radars is often achieved by reducing scanning rates, providing narrower (or more focused) beams, etc. In order to form focused beams with low pattern sidelobes, deep transmit and receive pattern nulls, good monopulse measurement capabilities, low time sidelobe levels, and high quality adaptive cancellation patterns, an antenna must be accurately characterized. Characterization includes accurate knowledge of the amplitude, phase, time and group delays of antenna components. The stationary or non-drifting components in the ESA antenna such as the T/R module electronics, analog signal paths, and manifolds are normally characterized at the factory, typically in a near field range. The ESA factory characterization is usually performed over a set of radiate/receive radio frequencies and operating temperatures. The characterization values are then stored in a tune table that is used by the beam steering computer to adjust the amplitude and phase values in the T/R module to form the desired beam pattern.

A desire for detection of low radar cross section targets in heavy clutter backgrounds in both ground and airborne applications may be met by radar systems with very low phase and amplitude noise stability and high dynamic ranges. Unfortunately, levels required to implement such radar systems may not be directly achievable at the component level, even with state of the art electronics. However, system improvements in stability and dynamic range may be achievable at the design level by paralleling the driving subsystem. For example, in the case of phase noise, paralleling an exciter such as distributed waveform generators (DWFGs), a master oscillator, and the receiver may assist in achievement of stability and dynamic range. Such paralleling may be achieved through distributing the DWFG and receivers on sub-arrays incorporated in the ESA architecture.

However, with the advent of DWFGs and distributed receivers to support a system requiring low noise, high stability, and high system dynamic ranges and the advent of technologies such as digital beam forming, performance would be enhanced by continually characterizing signal paths through the ESA rather than by simply relying on the factory characterization. Unfortunately, there is currently no mechanism by which parallel components within ESA architecture can be calibrated during normal operation using common signal injection paths between adjacent sub-arrays.

BRIEF SUMMARY OF THE INVENTION

Accordingly, in order to meet the stringent pattern null depths, time sidelobe levels, and cancellation ratios expected in present day and future digital beamforming radars, embodiments of the present invention may provide a method to achieve channel-channel time delay, phase and amplitude calibration during normal radar operation using self-calibrating common signal injection paths between adjacent sub-arrays. In this manner non-precision low cost cables can be used to provide the calibration signals between sub-arrays.

In one exemplary embodiment, a method for calibrating waveform generators and receivers of non-overlapping electronic scanning antennas is provided. The method includes calibrating a waveform generator and receiver of a first sub-array, configuring switch assemblies in each of the first sub-array and a second sub-array to provide a connection path between the first and second sub-arrays via a common calibration path, characterizing the common calibration path, calibrating a receiver of the second sub-array using the common calibration path, and calibrating the waveform generator of the second sub-array using the calibrated receiver of the second sub-array.

In another exemplary embodiment, another method for calibrating waveform generators and receivers of non-overlapping electronic scanning antennas is provided. The method includes configuring a first switch assembly in a first sub-array and a second switch assembly in a second sub-array to provide a connection path between the first and second sub-arrays via a common calibration path that has been previously characterized, calibrating a receiver of the second sub-array using the common calibration path, and calibrating the waveform generator of the second sub-array using the calibrated receiver of the second sub-array.

In another exemplary embodiment, a system for calibrating waveform generators and receivers of non-overlapping electronic scanning antennas is provided. The system includes a first sub-array, a second sub-array and a calibration cable. The first sub-array includes a first waveform generator, a first receiver, and a first switch assembly. The second sub-array includes a second waveform generator, a second receiver, and a second switch assembly. The calibration cable is configured to selectably form a common calibration path between the first and second sub-arrays based on a position of the first and second switch assemblies. The first and second switch assemblies are configured to enable calibration of the second receiver using an input from the first waveform generator via the calibration cable.

In another exemplary embodiment, a method for calibrating waveform generators and receivers of overlapping electronic scanning antennas is provided. The method includes calibrating a waveform generator and receiver of a first sub-array and shared sub-array, calibrating a receiver of the second sub-array using a shared calibration path, and calibrating the waveform generator of the second sub-array using the calibrated receiver of the second sub-array.

In another exemplary embodiment, a system for calibrating waveform generators and receivers of overlapping electronic scanning antennas. The system includes a first sub-array and a second sub-array. The first sub-array includes a first waveform generator, a first receiver, and a shared receiver. The second sub-array includes a second waveform generator, a second receiver, and the shared receiver. In an exemplary embodiment, one of the waveform generators may be shared as a calibration signal is generated between the first and second receivers. The first sub-array further includes a first transmit/receive module having a first wrap back path configured to wrap a calibration signal from a transmit manifold of the first sub-array to a receive manifold of the first sub-array and shared sub-array. The second sub-array further includes a second transmit/receive module having a second wrap back path configured to wrap a signal from a transmit manifold of the second sub-array to a receive manifold of the second sub-array and the shared sub-array of the first sub-array.

Embodiments of the invention provide an increased ability to quickly and accurately tune or calibrate components of large ESAs. As a result, system capabilities may be enhanced without substantially increasing system cost, downtime requirements and system volume.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 8 is a schematic diagram illustrating a calibration path for balancing and equalizing receivers in a sub-array according to an exemplary embodiment of the present invention;

FIG. 9 is a schematic diagram illustrating an exemplary signal path for determining calibration cable timing reference measurements according to an exemplary embodiment of the present invention;

FIG. 10 is a schematic diagram illustrating a calibration cable bounce back measurement according to an exemplary embodiment of the present invention;

Figure 1:
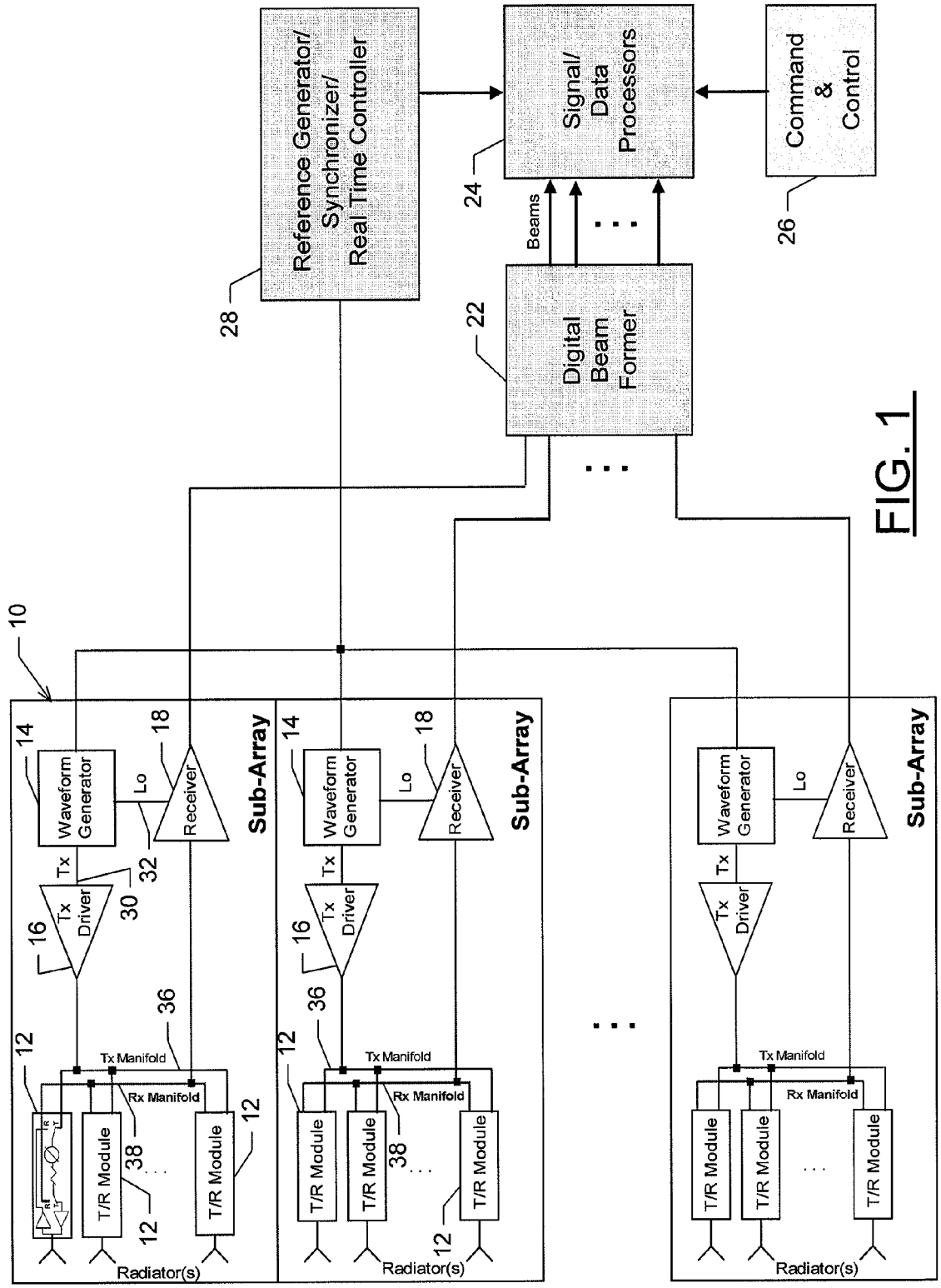
FIG. 1 is a diagram illustrating an exemplary ESA non-overlapping sub-arrayed architecture according to an exemplary embodiment of the present invention.

FIG. 11 is a schematic diagram illustrating a calibration path for calibrating a receiver of a first sub-array using a waveform generator in a second and adjacent sub-array according to an exemplary embodiment of the present invention; and FIG. 12 is a schematic diagram illustrating an exemplary configuration for calibrating adjacent waveform generators according to an exemplary embodiment of the present invention.

DETAILED DESCRIPTION OF THE INVENTION

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like reference numerals refer to like elements throughout.

FIG. 1 is a diagram illustrating an exemplary ESA non-overlapping sub-arrayed architecture. As shown in FIG. 1, the ESA non-overlapping architecture includes a plurality of sub-arrays 10. Each of the sub-arrays 10 includes a plurality of transmit/receive.(T/R) modules 12, a waveform generator 14, a transmit driver 16, and a receiver 18. The receiver 18 of each of the sub-arrays 10 is in communication with a digital beam former 22 which communicates beam information to a signal/data processor 24. The signal/data processor 24 is in communication with a command and control element 26 and a reference generator 28 which provides an input to the waveform generator 14 of each of the sub-arrays 10. The transmit and receive paths of each of the sub-arrays 10 are non-overlapping in that each sub-array 10 is fed from a corresponding independent waveform generator (i.e., the corresponding waveform generator 14 of each of the sub-arrays 10) which provides independent transmit waveforms 30 to the corresponding transmit driver 16 and independent local oscillator waveforms 32 to the corresponding receiver 18 of each of the sub-arrays 10.

Figure 2:
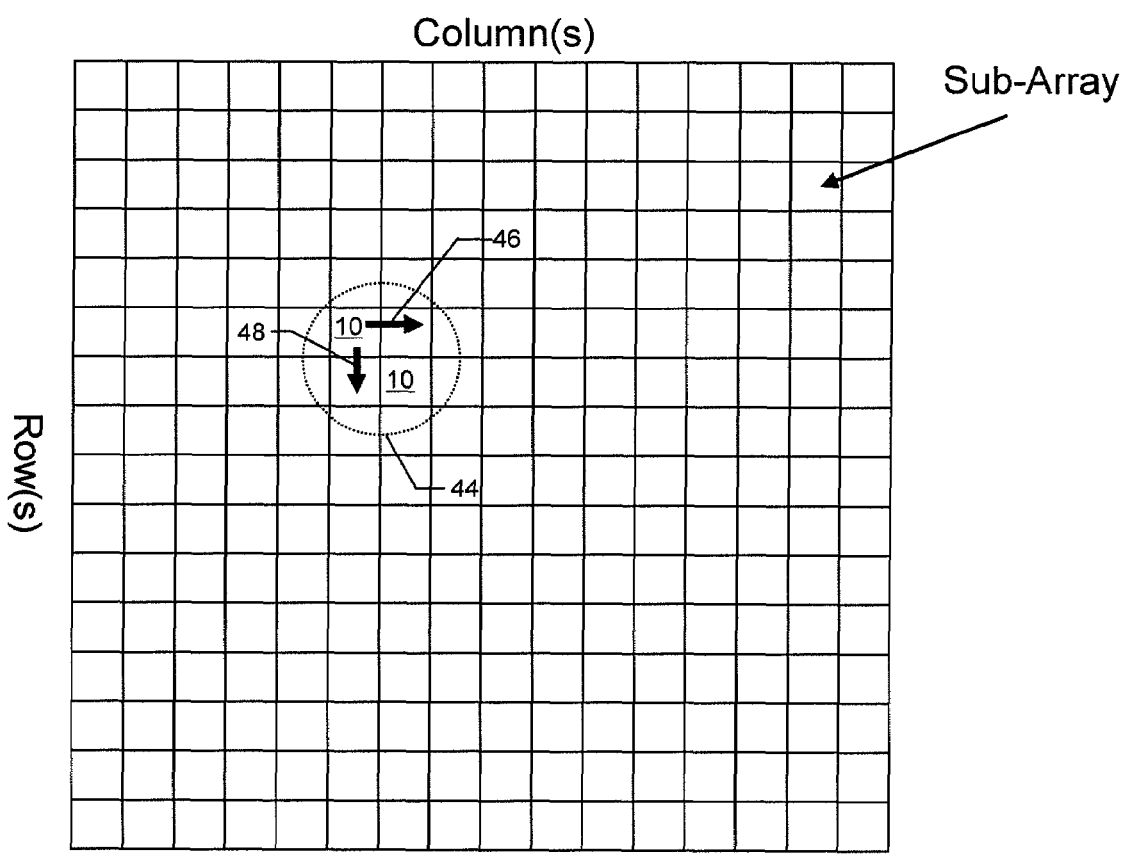
FIG. 2 illustrates a diagram of an ESA having a plurality of sub-arrays organized in rows and columns according to an exemplary embodiment of the present invention.

As shown in FIG. 1, the T/R modules 12 are each connected to a transmit manifold 36 and a receive manifold 38 corresponding to each of the sub-arrays 10. The transmit manifold 36 is in communication with the transmit driver 16 to receive transmit signals and the receive manifold 38 is in communication with the receiver 18 in order to communicate received signals to the receiver 18. It should be understood that the sub-arrays 10 may be organized in an array that extends in two dimensions as shown, for example, in FIG. 2. As shown in FIG. 2, sub-arrays may be adjacently disposed in horizontal and vertical directions to define both columns and rows of sub-arrays. In this regard, the sub-arrays 10 of FIG. 1 could be sub-arrays of a particular row, or alternatively, sub-arrays of a particular column.

As can be seen from FIG. 1, each of the sub-arrays 10 has corresponding and independent elements such as the waveform generator 14 and the receiver 18, but lacks common receive and transmit paths. Accordingly, it may be difficult to ensure that, during calibration of the ESA, each of the paths is characterized properly. It should also be noted that although FIG. 1 shows a single receiver element (receiver 18), the receiver 18 could include multiple receivers as described in greater detail below with reference to FIGS. 7-12. Furthermore, although FIG. 2 shows row/column and horizontal/vertical configurations for the sub-arrays 10, such configuration is merely exemplary and embodiments of the invention are equally useful when incorporated in other arrangements.

A typical analog beamforming ESA radar that may be used in current airborne fire control radars may include a single transmit signal distributed to the radiating elements and an analog beamformer which distributes the receive signal to the receivers. Since there is only a single transmit signal the transmit path (amplitude, phase, and group delay differences) can be characterized in the factory and only the output level of the single array driver may be calibrated. Such calibration may be easily done by measuring the output level at the array driver and using the factory characterized values to make the appropriate amplitude adjustments to adjust the array driver output to the desired signal level. A receive calibration injection manifold may be used to provide a common input signal to each of the receivers at the output of the analog beamformer. The receive calibration injection manifold may be precision manufactured to very tight specifications in order to achieve the deep pattern nulls and suitable cancellation ratios.

For a sub-arrayed architecture where the receivers are located at the sub-array level the receive calibration injection manifold would need to be nearly the same size as the aperture. It would be very difficult if not impossible to build this type of precision manifold to the necessary tolerances. Another approach may be to remotely locate the receivers away from the sub-array. However, such a construction would require many interconnecting cables, increasing the radio frequency loss and degrading system sensitivity, although the receive calibration injection manifold could be made smaller. Each of the interconnecting cables would then need to be characterized (amplitude, phase, and group delay) and re-tuned in the event of replacement of one of the interconnecting cables, thereby requiring a method to inject a calibration signal at the sub-array. The additional cables and sub-array calibration ports add cost and weight to the system.

Embodiments of the present invention may eliminate the need for precision calibration manifolds and cables. Additionally, embodiments of the present invention may provide a common calibration injection path for calibrating waveform generators and receivers across sub-arrays. In one embodiment of the present invention a method for calibrating a sub-arrayed non-overlapping ESA architecture is provided. The non-overlapping architecture is similar to an overlapping architecture in that the non-overlapping architecture also supports distributed waveform generators and receivers. One notable difference between overlapping and non-overlapping architectures is that for the over-lapping architecture digital waveform generators and receiver(s) are shared by the adjacent sub-arrays. Accordingly in a non-overlapping sub-array architecture there is no shared common path between sub-arrays. However, in order to calibrate each of the sub-arrays, it may be advantageous to provide a common reference signal between sub-arrays, at least for calibration purposes.

Figure 3:
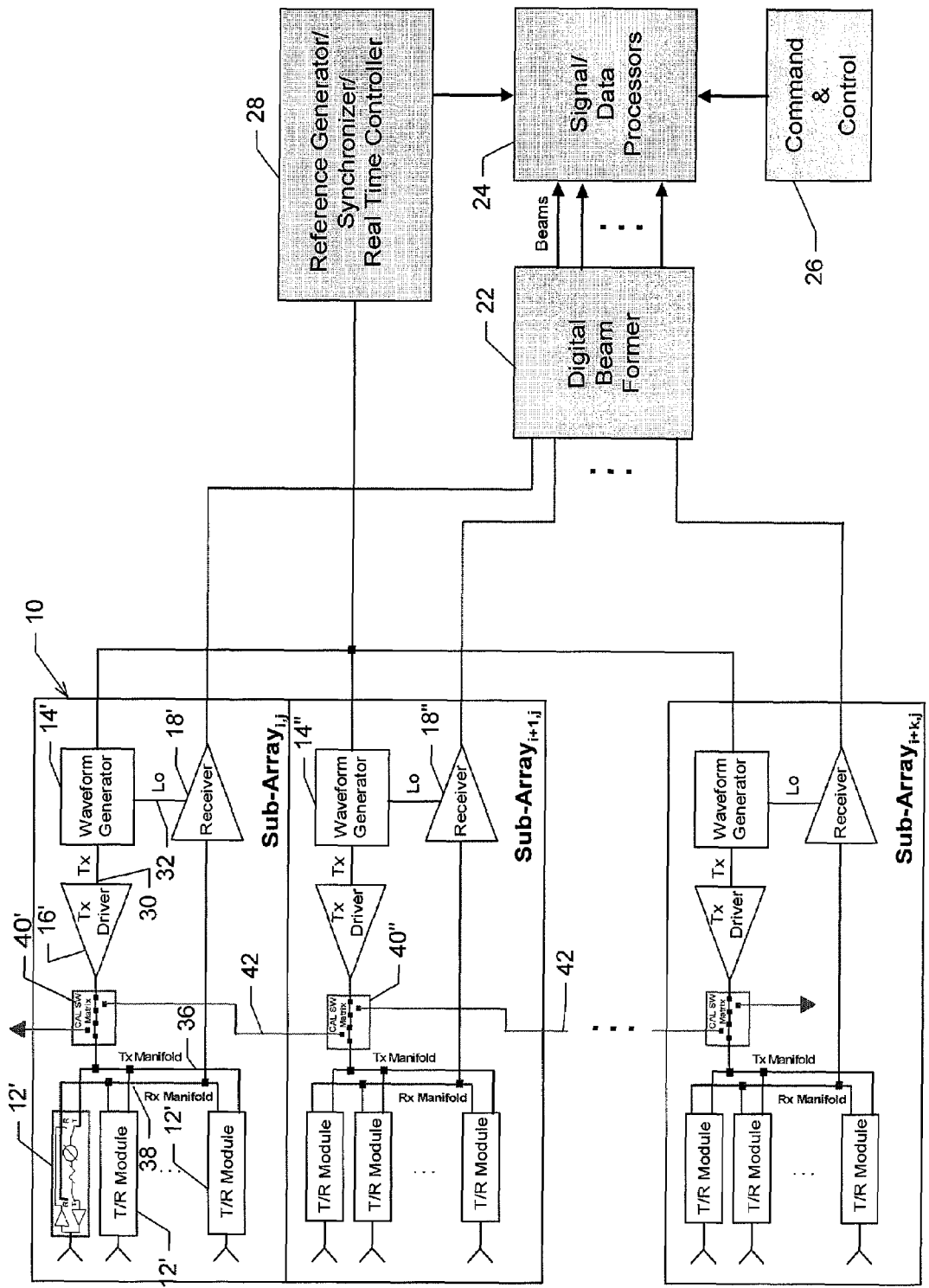
FIG. 3 is a diagram illustrating an ESA non-overlapping sub-arrayed architecture having a CSC (calibration switch circuit) according to an exemplary embodiment of the present invention.

Accordingly, as shown in FIG. 3 and following, embodiments of the present invention provide a mechanism by which transmit and receive calibration signals may be applied without adding a need for precision high cost calibration manifolds while minimizing additional weight penalties added to the system to support calibration. The following paragraphs describe a calibration approach as implemented in an Active Electronic Scanning Array (AESA) architecture. However, it should be noted that the calibration approach described herein is applicable to all ESA sub-array architectures consisting of non-overlapped digital waveform generators and receivers.

The calibration approach described herein is not limited to only the receiver arrangements disclosed. Rather, the disclosed receiver arrangements are merely provided for purposes of example and not of limitation. As such, embodiments of the present invention are also applicable to receivers placed at the element level, row or column combinations of elements in the sub-array or sub-array manifolded output. Receiver outputs at each sub-array may then be digitized and passed to the digital beam former 22. Since, as shown in FIG. 1, there are no common transmit or receive paths between sub-arrays, embodiments of the present invention provide for inclusion of common calibration paths without a need for factory characterized or precision manufactured cables or manifolds. Accordingly, improved calibration may be achieved without significantly increasing hardware and array integration system costs.

FIG. 3 is a diagram illustrating an ESA non-overlapping sub-arrayed architecture having a CSC (calibration switch circuit) 40 according to an exemplary embodiment of the present invention. It should be noted that, with the exception of the addition of the CSC 40 to each of the sub-arrays 10 and the addition of interconnecting wiring 42 between each of the sub-arrays 10, FIG. 3 is identical to FIG. 1 and thus like elements retain like reference numerals. However, since it may from time to time be necessary to describe elements in adjacent sub-arrays, prime designations will be used in reference to such elements. Thus, hereinafter elements in a first sub-array (i.e., Sub-Array$_{i,j}$) will be referred with a prime designation and elements of a second sub-array (i.e., Sub-Array$_{i+1,j}$) will be referred to with a double prime designation (e.g., waveform generator 14"). Meanwhile, when an element of no specific sub-array is being referred to, no prime designation will be provided. However, it should be noted that like numbered elements without a prime designation, with a prime designation or with a double prime designation should be understood as being substantially identical in function except that they are disposed in correspondingly different sub-arrays. It should also be noted that any number of sub-arrays could be employed and not just three, as shown in FIGS. 1, 3 and 7-12. Furthermore, it should be noted that although the CSC 40 is shown as being inserted on the transmit manifold 36 side of the T/R modules 12, the CSC 40 could also be inserted on the receive manifold 38 side of the T/R modules 12.

As shown in FIG. 3 the reference generator 28 is in communication with the waveform generator 14 of each of the sub-arrays 10. The reference generator 28 includes a master oscillator, synchronizer and real time generator. The master oscillator creates a reference signal used by the waveform generator 14 to generate the transmit waveforms 30 and the local oscillator waveforms 32. The synchronizer generates timing signals using the master oscillator as the reference. These timing signals are distributed to the remaining sub-systems of the radar to ensure each sub-system performs corresponding operations at respective times. The real time controller generates beam commands to individual sub-arrays to collimate a transmit/receive beam in a desired direction. The waveform generator 14 includes two direct digital synthesizers (DDS). One of the two DDS generates the modulated transmit waveforms 30 which form a transmit signal from the corresponding waveform generator 14. The other of the two DDS generates the local oscillator waveforms 32 that include a local oscillator signal for use in mixing with a received signal to form a coherent baseband signal at the receiver 18.

The transmit waveforms 30 are communicated to the transmit driver 16. The transmit driver 16 may be an amplifier tuned to the frequency of the transmit waveforms 30. As such the transmit driver 16 may amplify the transmit waveforms 30 from the waveform generator 14 in order to provide a signal to the transmit manifold 36 which is of a magnitude that is suitable to enable splitting of the signal many times to supply each of the T/R modules 12. Each T/R module may include, for example, a transmit high power amplifier (HPA), a receive low noise amplifier (LNA), an attenuator and a phase shifter. During transmission, an input signal from the transmit driver 16 may be amplified by the HPA just prior to being radiated into free space. During reception of an incoming signal, the signal may be amplified by the LNA. By placing the LNA close to the antenna, significant signal losses are reduced. The phase shifter may be adjusted to achieve beam collimation for transmit and receive signals in a desired direction. The T/R modules 12 are described in greater detail below.

The receive manifold 38 sums analog outputs from the T/R modules 12 prior to communication of the outputs to the receiver 18. The receiver 18 processes the analog signals from the T/R modules 12 into quantized signals suitable for processing in the digital beam former 22 and signal/data processor 24. In general terms, beamforming is the spatial filtering of signals. The digital beam former 22 receives digital inputs from the receiver 18 of each of the sub-arrays 10 and sums the digital inputs to create a single beam with a maximum output in a direction of a desired signal. The signal/data processor 24 includes computer elements, such as hardware components, software or combinations thereof, which act on quantized samples of an analog signal, for example, to detect a desired signal in the presence of interference. The signal/data processor 24 performs operations including, for example, pulse compression, Doppler filtering, constant false alarm rate determination, thresholding, and data extraction. The command and control element 26 may be a computer or other processing element which stores pre-determined operations or commands and distributes the commands to radar sub-systems and components. These operations or commands may include the beam pointing angle, mode, and waveform control.

As shown in FIG. 3, the CSC 40 provides a mechanism by which the interconnecting wiring 42 (i.e., a calibration cable) may provide a common calibration signal path between the transmission manifolds of adjacent sub-arrays 10. It should be noted that, although FIG. 3 could represent either sub-arrays 10 in a same column (i.e., vertically adjacent) or in a same row (i.e., horizontally adjacent), the CSC 40 provides a mechanism by which connection may be made to adjacent sub-arrays in both the column (vertical) and row (horizontal) directions as shown, for example, in the highlighted portion 44 of FIG. 2. In this regard, the CSC 40 provides a switching mechanism through which the interconnecting wiring 42 may be used to make or break connections between adjacent sub-arrays 10 and within the transmission manifold 36 of a particular sub-array. Accordingly, the CSC 40 of each of the sub-arrays 10 may receive an input from the waveform generator 14 of the CSC's own sub-array or a waveform generator of a preceding column or preceding row. For example, as shown in FIG. 3, if it is assumed that i represents sub-array column position and j represents sub-array row position, the CSC 40" of Sub-Array$_{i+1,j}$ may receive an input directly from waveform generator 14" of Sub-Array$_{i+1,j}$ via the transmit driver 16" of Sub-Array$_{i+1,j}$, or may receive an input from the waveform generator 14' of Sub-Array$_{i,j}$ via the interconnecting wiring 42 and the CSC 40' of Sub-Array$_{i,j}$. Accordingly, a calibration signal from a first sub-array can be used to calibrate the transmit and receive paths of both the first sub-array and a second sub-array that is adjacent to the first sub-array. The CSC 40 of each of the sub-arrays 10 provides three output paths. In this regard, a first output path may be considered a normal output path which routes transmit signals from the transmit driver 16 of a particular sub-array to the T/R modules 12 of the particular sub-array. A second output path may be considered a horizontally adjacent output path which routes transmit signals from the transmit driver of a particular sub-array to the CSC of a horizontally adjacent (i.e., next lower row position) sub-array. A third output path may be considered a vertically adjacent output path which routes transmit signals from the transmit driver of a particular sub-array to the CSC of a vertically adjacent (i.e., next lower column position) sub-array. For example, as shown in FIG. 2, arrow 46 indicates a portion of the second output path connecting a particular sub-array (SA$_{4,5}$) to a horizontally adjacent sub-array (SA$_{5,5}$), while arrow 48 indicates a portion of the third output path connecting the particular sub-array (SA$_{4,5}$) to a vertically adjacent sub-array (SA$_{4,6}$). Accordingly, the CSC 40 provides additional signal path options which may be utilized in connection with calibration of adjacent sub-arrays. Thus, the CSC 40 provides an ability to measure relative amplitude, phase, group delay differences and path errors between a normal signal path and a calibration signal path.

Figure 4:
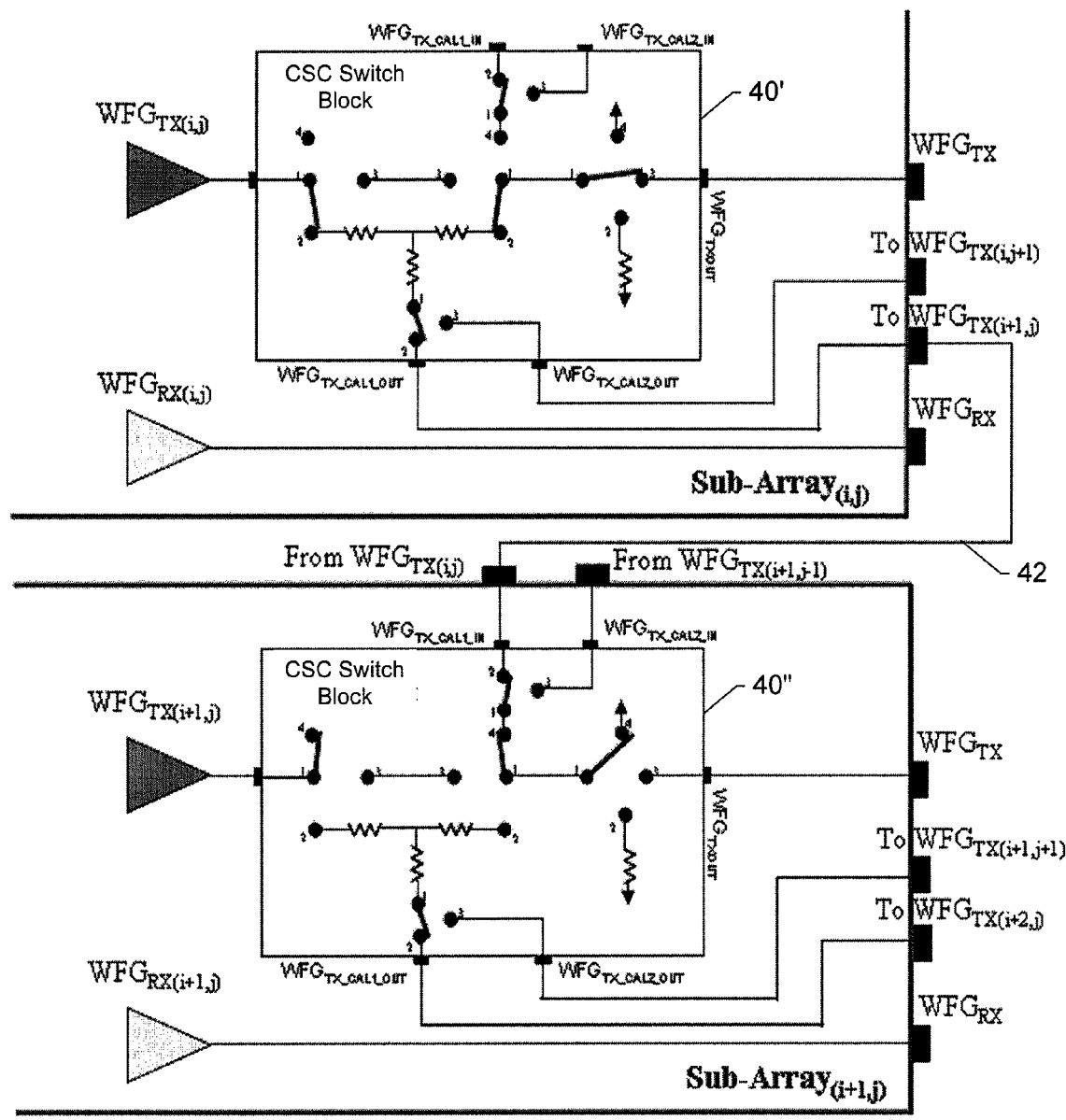
FIG. 4 shows a more detailed illustration of the CSC according to an exemplary embodiment of the present invention.
Figure 5:
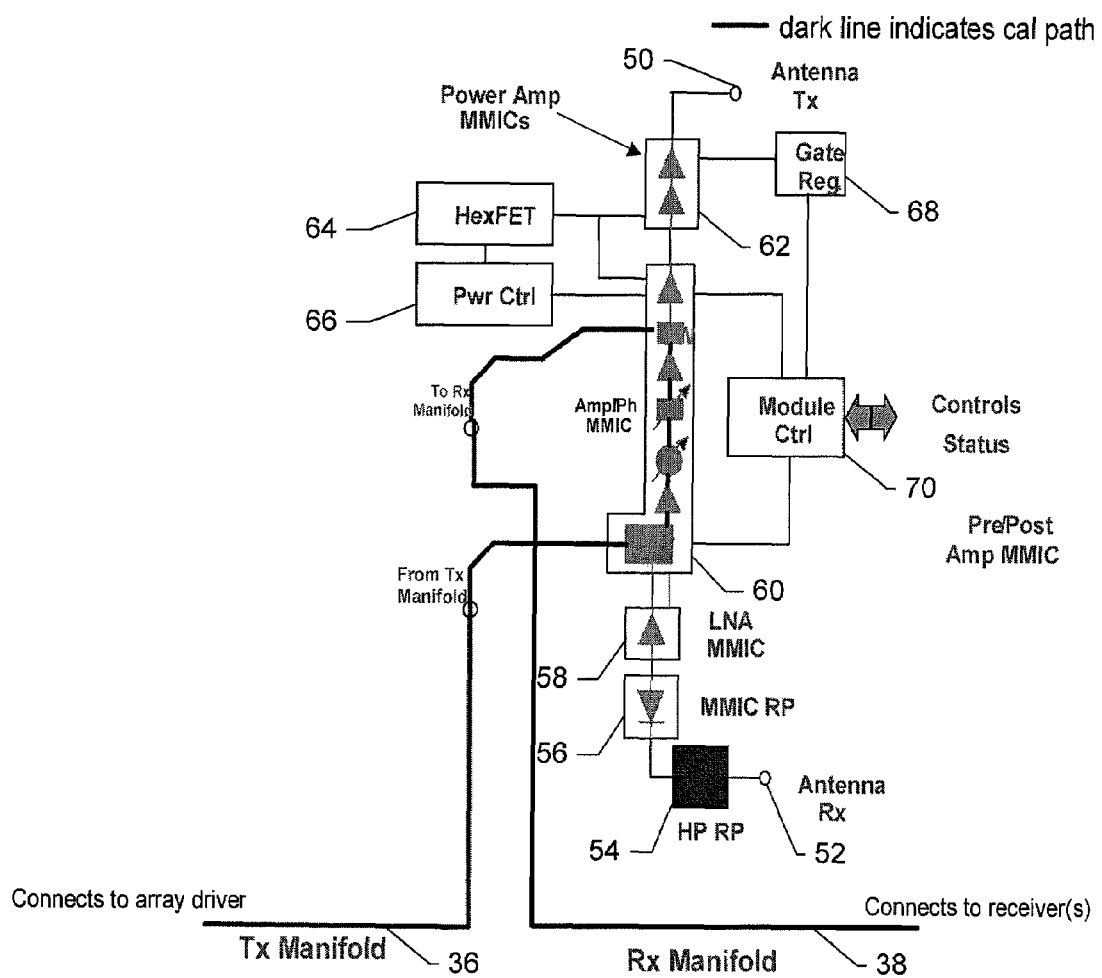
FIG. 5 shows a wrap back feature for use in a transmit/receive module according to an exemplary embodiment of the present invention.

FIG. 4 shows a more detailed illustration of the CSC 40 according to an exemplary embodiment. More specifically, FIG. 4 shows the CSC 40' of a first sub-array (Sub-Array$_{i,j}$) and the CSC 40" of an adjacent sub-array (Sub-Array$_{i+1,j}$) in "bounce-back" mode according to an exemplary embodiment. As such, FIG. 4 shows switch positions within each of the CSCs that are set to enable measurement of path differences between the normal transmit signal from DWFG$_{TX(i+1,j)}$ (i.e., the transmit waveforms 30 of Sub-Array$_{i+1,j}$ from FIG. 3) and the calibration signal from DWFG$_{TX(i,j)}$ (i.e., the transmit waveforms 30 of Sub-Array$_{i,j}$ from FIG. 3). In bounce-back mode, the switch positions of CSCs are placed such that one portion of the calibration transmit signal is split at the CSC 40' and wrapped back through the T/R module to the sub-array receiver, while the other portion of the calibration transmit signal will be bounced back to the sub-array receiver via the CSC 40" of an adjacent sub-assembly. In other words, a portion of a calibration signal path from the waveform generator 14' may be wrapped back through the T/R modules 12' to the receiver 18' of a particular sub-array 10 (i.e., Sub-Array$_{i,j}$), and the other portion may be reflected through the interconnecting wiring 42 to provide a characterization of the interconnecting wiring 42. FIG. 5 shows an exemplary embodiment of a wrap back feature that may be added to a conventional T/R module design. In FIG. 5, a dark line indicates the calibration wrap back path.

As shown in FIG. 5, a T/R module may include a transmitting antenna terminal 50, a receive antenna terminal 52, a high power receiver protector (HP RP) 54, a MIMIC RP 56, a low noise amplifier (LNA) MIMIC 58, an amplifier/phase shifter MIMIC 60, a power amplifier MIMIC 62, a hexagonal field effect transistor (HEX FET) 64, a power controller 66, a gate regulator 68 and a module controller 70. The receive antenna terminal 52 may be in communication with the HP RP 54 which protects the T/R module MIMIC RP 56 and LNA MIMIC 58 from high power interference signals. The MIMIC RP 56 protects the LNA MIMIC 58 from average power interference signals. The HEX FET 64 provides power rectification for the power amplifier MIMIC 62, which the power controller 66 controls power to the final stage amplifiers of the amplifier/phase shifter MIMIC 60. The amplifier/phase shifter MIMIC 60 is part of both the transmit and receive paths and contains driver amplifiers, attenuator, and phase shifter circuits. The gate regulator 68 controls the transmit enable for the power amplifier MMIC 62. The module controller 70 commands phase shifter settings, transmit and receive enables, and status of the T/R module. As shown in FIG. 5, amplifier components not included in the wrap back path include the power amplifier MIMIC 62, the LNA MIMIC 58, the MIMIC RP 56 and the HP RP 54. These components can be characterized, for example, by calculating characteristics for the transmit path and summing characteristics for the receive path before subtracting the wrap back path characteristics. Such characterization may be performed initially at the factory and stored into local memory. Should a T/R module be replaced, the information of the replacement unit may be substituted for the failed unit.

Figure 6:
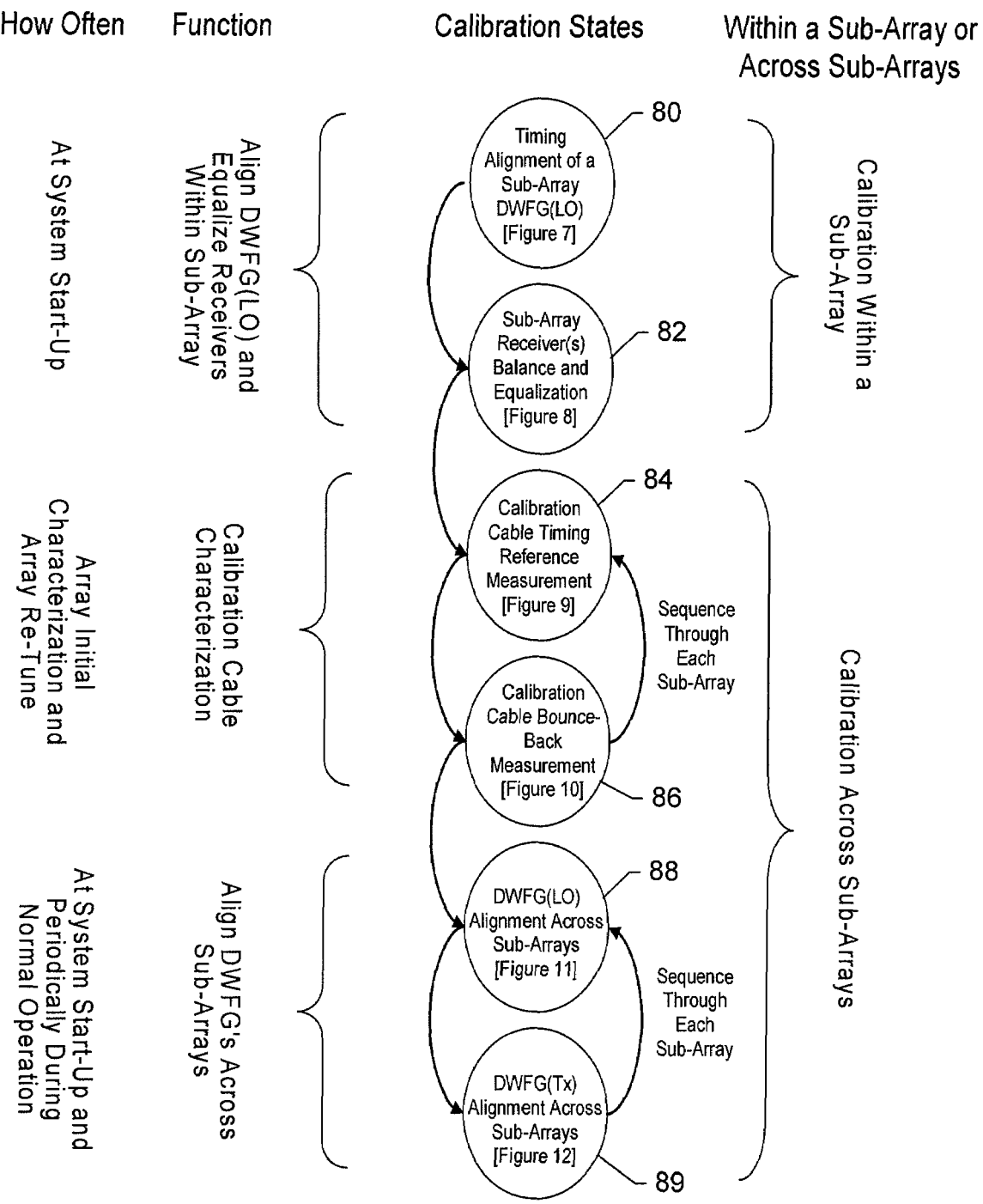
FIG. 6 shows a flowchart of a system and method for calibrating a non-overlapped sub-array distributed waveform generator and distributed receiver without precision cables according to an exemplary embodiment of the present invention.

FIG. 6 shows a flowchart of a system and method for calibrating a non-overlapped sub-array distributed waveform generator and distributed receiver without precision cables according to an exemplary embodiment. It will be understood that each block or step of the flowcharts, and combinations of blocks in the flowcharts, can be implemented in various ways and thus, FIG. 6 is provided by way of example and not of limitation. Accordingly, blocks or steps of the flowcharts support combinations of means for performing the specified functions and combinations of steps for performing the specified functions.

As shown in FIG. 6 a method for calibrating a non-overlapped sub-array distributed waveform generator and distributed receiver without precision cables includes performing a timing alignment of a distributed waveform generator local oscillator of a particular sub-array at operation 80. A more detailed explanation of operation 80 is provided below in reference to FIG. 7. At operation 82, the sub-array receiver or receivers of the particular sub-array is/are balanced and equalized as explained in greater detail in reference to FIG. 8. For example, receiver frequency responses in each sub-array may be balanced and equalized. As a result of operations 80 and 82, the distributed waveform generator local oscillator of the particular sub-array is aligned and receiver(s) of the particular sub-array are equalized within the particular sub-array. In other words, calibration has been performed within the particular sub-array. Operations 80 and 82 may be performed, for example, at system startup since at initial system startup, the distributed waveform generators may be in unknown states and therefore, must be calibrated.

At operation 84, a reference measurement may be performed to determine calibration cable timing (i.e., a reference measurement of characteristics of the interconnecting wiring 42). FIG. 9 shows an exemplary embodiment in which operation 84 is performed in greater detail. At operation 86, a calibration cable bounce back measurement may be performed as shown in greater detail in reference to FIG. 10. Operations 84 and 86, when performed in sequence, provide a characterization of the calibration cable which may be performed, for example, during array initial characterization and re-tuning. Operations 84 and 86 may be performed in sequence for each sub-array, such that the calibration cables connecting each adjacent pair of sub-arrays is characterized.

At operation 88, distributed waveform generator local oscillator alignment may be performed across sub-arrays. An exemplary embodiment of operation 88 is described in greater detail below in reference to FIG. 11. Following operation 88, the distributed waveform generator transmitter is aligned across sub-arrays at operation 89. FIG. 12 illustrates in greater detail, an exemplary embodiment of operation 89. Operations 88 and 89 are performed in sequence with respect to all of the sub-arrays in order to align both the transmit and local oscillator signals (i.e., the transmit waveforms 30 and the local oscillator waveforms 32, respectively) of each of the sub-arrays. Operations 88 and 89 may be performed at system startup and periodically during normal operation. Accordingly, while operations 80 and 82 provide calibration within a sub-array, operations 84, 86, 88 and 89 provide for calibration across sub-arrays.

As stated above, FIGS. 7-12 show more detailed explanations of corresponding operations 80-89 according to an exemplary embodiment. It should be noted that the components of FIGS. 7-12 are substantially identical to those shown in FIG. 3. Accordingly, recitations of the functions of the various components will not be repeated. Rather it should be understood that FIGS. 7-12 merely show exemplary operations based upon different switch positions and signal paths within the CSCs and within the sub-arrays, respectively.

Figure 7B:
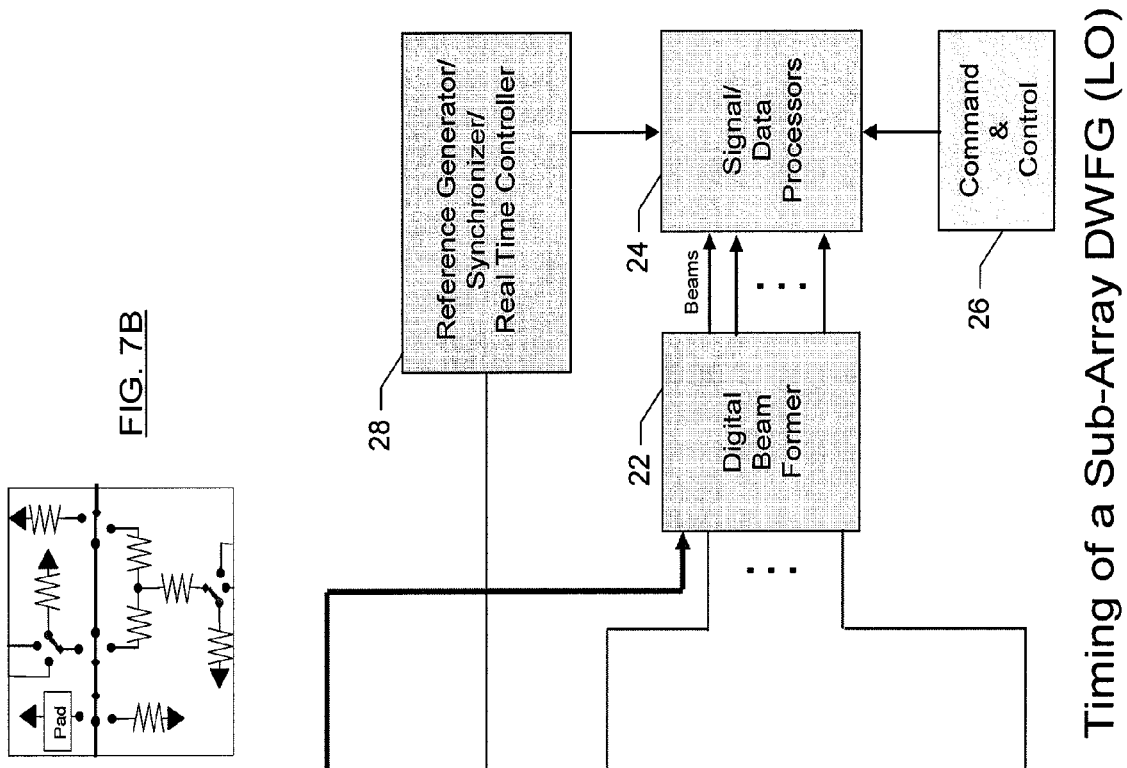
FIG. 7 is a schematic diagram illustrating a timing alignment of a distributed waveform generator local oscillator of a particular sub-array according to an exemplary embodiment of the present invention.
Figure 7A:
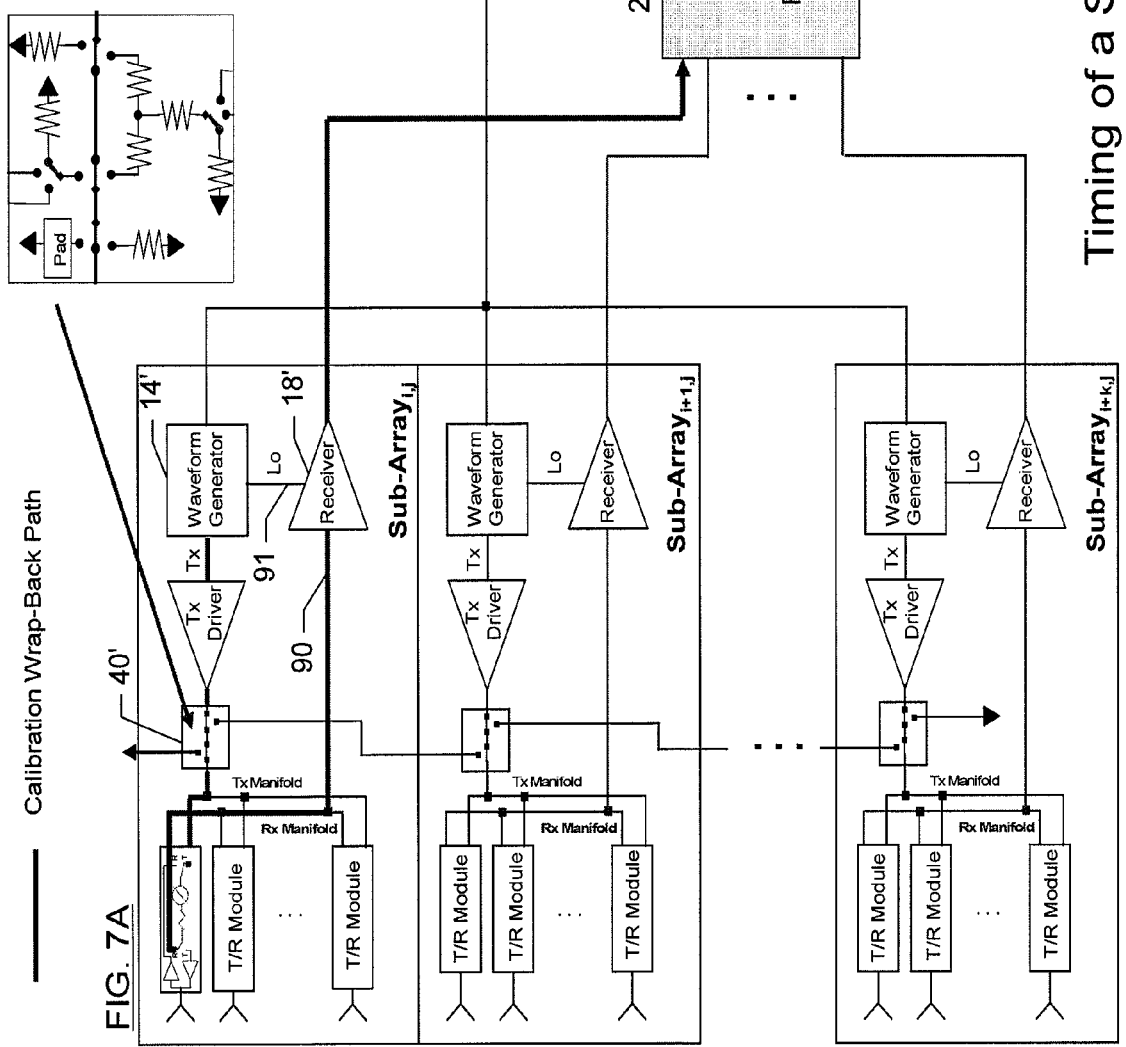

As stated above, FIG. 7A provides a more detailed explanation of operation 80 in which a timing alignment of a distributed waveform generator local oscillator of a particular sub-array is performed. In FIG. 7A, a dark or highlighted line indicates a calibration path 90.

FIG. 7B is an enlarged view of the CSC 40' of Sub-Array$_{i,j}$ which illustrates exemplary switch positions within the CSC 40' for the performance of operation 80. As shown in FIG. 7, for example, timing of the distributed waveform generator local oscillator (i.e., local oscillator waveforms 32) may be adjusted to be centered in the passband of the corresponding receiver within the particular sub-array. In this regard, a calibration signal is transmitted via the highlighted calibration path 90 which is wrapped back to the receiver 18'. The distributed waveform generator local oscillator signal 91 is then adjusted to be centered into the center of the receiver passband response. It should be noted that while FIG. 7 and other figures show only a single wrap back path through one T/R module, it is possible for the wrap back path to pass through multiple or even all of the T/R modules.

FIG. 8A shows the calibration path for balancing and equalizing receivers in a sub-array according to operation 82, which may include two processes. First, receivers within a sub-array are pre-equalized, which includes aligning the receivers over both signal and noise levels and balancing the frequency response between receivers by minimizing absolute amplitude and phase errors. Since the first process only aligns the receivers in amplitude and phase, but not timing, a second process is implemented to correct for group delay differences and to further minimize amplitude and phase errors by equalizing frequency responses between receivers. During the second process, an equalization coefficient may be calculated and applied to receiver outputs in the digital beam former 22. The calibration path 90 for use in connection with operation 82 is the same as the path used in connection with operation 80. As shown in FIG. 8B, a phase shifter within the T/R module 12' providing the wrap back path may be adjusted for maximum signal strength prior to equalization. Accordingly, receivers within a sub-array may be balanced and equalized using the distributed waveform generator of the sub-array to provide a common reference source for the receivers.

FIG. 9A shows an exemplary signal path for determining calibration cable timing reference measurements according to an exemplary embodiment. As shown in FIG. 9A, a dark or highlighted line indicates a calibration reference path 92 may be substantially similar to the calibration path 90 of FIGS. 7 and 8 except that the CSC 40' of Sub-Array$_{i,j}$ is positioned such that the calibration reference signal is split. As such, a portion of the calibration reference path 92 passes a signal through the wrap back path to the receiver 18' of the Sub-Array$_{i,j}$, while the remaining portion of the calibration reference path 92 passes a signal through the interconnecting wiring 42 to the CSC 40" of the adjacent sub-array (i.e. the Sub-Array$_{i+1,j}$). In an exemplary embodiment, a linear frequency modulated (LFM) stretch waveform may be used to measure characteristics of the line length of the interconnecting wiring 42 between particular CSCs. In this regard, a measurement of line characteristics (phase shift, delay, etc.) is made by terminating the calibration path in a load 94. As shown in FIG. 9B, the CSC 40' of Sub-Array$_{i,j}$ may be positioned such that the calibration reference signal is split, while FIG. 9C shows that CSC 40" of the Sub-Array$_{i+1,j}$ is positioned such that the calibration reference signal is terminated in the load 94 to eliminate any reflections which might corrupt measurements.

FIG. 10A shows a more detailed description of a calibration cable bounce back measurement of operation 86 according to an exemplary embodiment. In FIG. 10A, a dark or highlighted line indicates a calibration path of the calibration reference signal and a dashed line indicates a calibration bounce pack path. As shown in FIG. 10B, the CSC 40' of Sub-Array$_{i,j}$ remains positioned such that the calibration reference signal is split while, as shown in FIG. 10C, the CSC 40" of the Sub-Array$_{i+1,j}$ is positioned such that the calibration reference signal is redirected into a padded short 96 in order to reflect (or bounce back) the signal through the CSCs to the receiver 18'. Using the LFM stretch calibration waveform that is bounced back, a signal frequency offset may be measured by comparing the bounced back signal to the measurement taken when the calibration reference signal was terminated in the load 94. The sub-array to sub-array calibration path length of the interconnecting wiring 42 may then be determined by substracting the bounce back offset frequency from the reference measurement. The operations shown in FIGS. 9 and 10 (i.e., operations 84 and 86, respectively) may be performed for each sub-array to sub-array calibration path. As stated above, such operations may be performed on initial characterization, for re-tuning or for re-characterization following the replacement of a calibration cable. Accordingly, there are two calibration paths per adjacent sub-array making 2N(N−1) paths to be characterized. However, because there are independent waveform generators 14 and receivers 18 in each of the sub-arrays 10, multiple calibration paths may be characterized simultaneously to minimize time spent characterizing cable lengths, thereby reducing reliance upon precision cables and reducing overall system costs.

Once calibration paths between sub-arrays have been characterized, waveform generators 14 and receivers 18 between sub-arrays can be aligned to each other. In this regard, it is desired that the individual waveform generators 14 and receivers 18 of each of the sub-arrays 10 are calibrated such that each of the sub-arrays 10 is electrically identical. Thus, for example, once the waveform generator 14' and receiver 18' of Sub-Array$_{i,j}$ are calibrated and the interconnecting wiring 42 between Sub-Array$_{i+1,j}$ and Sub-Array$_{i,j}$ has been characterized, the interconnecting wiring 42 may be utilized to align (i.e., equalize) the input to the digital beam former 22 from Sub-Array$_{i,j}$ with the input to the digital beam former 22 from Sub-Array$_{i+1,j}$ in order to calibrate the receiver 18" of Sub-Array$_{i+1,j}$ (as shown in FIG. 11) and the calibrated receiver may be utilized to calibrate the waveform generator 14" of Sub-Array$_{i+1,j}$ (as shown in FIG. 12).

FIG. 11A shows an exemplary configuration for calibrating the receiver 18" of Sub-Array$_{i+1,j}$ according to operation 88. In FIG. 11A, a dark or highlighted line indicates a calibration shared path by which a reference signal and a equalization signal are provided to the digital beam former 22. By placing the CSC 40' of Sub-Array$_{i,j}$ in a configuration to split the calibration signal from the waveform generator 14' of Sub-Array$_{i,j}$, as shown in FIG. 11B, the CSC 40" of Sub-Array$_{i+1,j}$ may be placed in a configuration shown in FIG. 11C in order to communicate the calibration signal from the waveform generator 14' of Sub-Array$_{i,j}$ through the wrap back path of Sub-Array$_{i+1,j}$ to the receiver 18" of Sub-Array$_{i+1,j}$. Then, the receiver 18" of Sub-Array$_{i+1,j}$ may be adjusted until the input of Sub-Array$_{i+1,j}$ to the digital beam former 22 is equalized (for example, in frequency, amplitude and phase) with the input of Sub-Array$_{i,j}$ to the digital beam former 22. Such equalization may be possible due to the common source and the characterized interconnecting wiring 42. All receivers of all sub-arrays may be equalized in similar fashion.

After equalizing receivers in adjacent sub-arrays, the waveform generators 14 of the adjacent sub-arrays may be calibrated. FIG. 12A shows an exemplary configuration for calibrating adjacent waveform generators according to operation 89. In FIG. 12A, dark or highlighted lines indicate a calibration reference path and a parallel calibration path, respectively, provided to the digital beam former. In this regard, as shown in FIG. 12B the CSC 40' of Sub-Array$_{i,j}$ may be positioned to eliminate the signal path from Sub-Array$_{i,j}$ to Sub-Array$_{i+1,j}$ via the interconnecting wiring 42. Meanwhile, as shown in FIG. 12C, the CSC 40" of Sub-Array$_{i+1,j}$ may also be placed such that a calibration signal path passes from the waveform generator 14" of Sub-Array$_{i+1,j}$ through the wrap back path of Sub-Array$_{i+1,j}$ and on to the receiver 18" of Sub-Array$_{i+1,j}$. By adjusting the waveform generator 14" of Sub-Array$_{i+1,j}$ until the input of Sub-Array$_{i+1,j}$ to the digital beam former 22 is equalized (for example, in frequency, amplitude and phase) with the input of Sub-Array$_{i,j}$ to the digital beam former 22, the waveform generator 14" of Sub-Array$_{i+1,j}$ may be calibrated. After completion of operations 84 to 89, the waveform generators and receivers are calibrated across all of the sub-arrays.

Accordingly, in general terms, a method according to an embodiment of the present invention includes a process of calibrating a waveform generator and receiver of a first sub-array. Switch assemblies in each of the first sub-array and a second sub-array are configured to provide a connection path between the first and second sub-arrays via a common calibration path. Using the common calibration path, which extends between switching assemblies disposed in each of the adjacent first and second sub-arrays, a process of characterizing the common calibration path may be performed. Utilizing the characterized common calibration path, a process of calibrating a receiver of the second sub-array may be performed. Finally, utilizing the calibrated receiver, the waveform generator of the second sub-array may be performed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

It should be noted that although methods for calibration of distributed waveform generators and receivers for a non-overlapped sub-array array have been described in detail above, such methods can also be applied for an overlapped sub-array array. In such a situation, cable(s) interconnects between sub-arrays in the non-overlapped array would not be required since a single transmit waveform generator would be common to more than one sub-array. Accordingly, the common waveform generator may be utilized to transmit and receive local oscillator signal paths between overlapped sub-arrays for the calibration manifold. Timing alignment, receiver equalization, and wrap-back as detailed for the non-overlapping array remain the same.

That which is claimed:

1. A method for calibrating waveform generators and receivers of non-overlapping electronic scanning antennas, the method comprising:
   calibrating a waveform generator and receiver of a first sub-array;
   configuring switch assemblies in each of the first sub-array and a second sub-array to provide a connection path between the first and second sub-arrays via a common calibration path;
   characterizing the common calibration path;
   calibrating a receiver of the second sub-array using the common calibration path; and
   calibrating the waveform generator of the second sub-array using the calibrated receiver of the second sub-array.

2. The method of claim 1, wherein configuring switch assemblies comprises switching a switch assembly of the first sub-array to split a calibration signal between the first and second sub-arrays.

3. The method of claim 2, wherein characterizing the common calibration path comprises:
   measuring characteristics of the common calibration path while terminating the split calibration signal in a load by placing a switch assembly of the second sub-assembly in a first position;
   measuring characteristics of the common calibration path in response to switching of the switch assembly of the second sub-assembly to a second position in order to reflect the split calibration signal back to the first sub-assembly; and
   determining the characterization of the common calibration path based on the characteristics measured in the first and second positions.

4. The method of claim 2, wherein calibrating the receiver of the second sub-array comprises utilizing the split calibration signal to match an output of the receiver of the first sub-array with an output of the receiver of the second sub-array by adjusting the receiver of the second sub-array.

5. The method of claim 4, wherein calibrating the waveform generator of the second sub-array comprises:
   adjusting the switch assemblies of the first and second sub-arrays to open the connection path between the first and second sub-arrays; and
   adjusting the waveform generator of the second sub-array to match the output of the receiver of the first sub-array with the output of the receiver of the second sub-array.

6. The method of claim 1, wherein calibrating the waveform generator and the receiver of the first sub-array comprises:
   performing a timing adjustment of a waveform generator local oscillator signal of the first sub-assembly; and
   balancing and equalizing the receiver of the first sub-assembly.

7. The method of claim 6, wherein balancing and equalizing the receiver comprises:
   aligning the receiver over both signal and noise levels;
   balancing the frequency response of the receiver by minimizing absolute amplitude and phase errors; and
   performing a phase shift adjustment for maximum signal strength prior to equalizing.

8. The method of claim 1, further comprising an initial operation of providing a wrap back path in each of the sub-assemblies which wraps a calibration signal from a transmit manifold of each of the first and second sub-arrays to a receive manifold of each corresponding one of the first and second sub-arrays via at least a portion of a transmit/receive module of each corresponding one of the first and second sub-arrays.

9. A method for calibrating waveform generators and receivers of non-overlapping electronic scanning antennas, the method comprising:
   configuring a first switch assembly in a first sub-array and a second switch assembly in a second sub-array to provide a connection path between the first and second sub-arrays via a common calibration path that has been previously characterized;
   calibrating a receiver of the second sub-array using the common calibration path; and
   calibrating the waveform generator of the second sub-array using the calibrated receiver of the second sub-array.

10. The method of claim 9, wherein configuring the first switch assembly comprises switching the first switch assembly to split a calibration signal between the first and second sub-arrays.

11. The method of claim 10, wherein calibrating the receiver of the second sub-array comprises utilizing the split calibration signal to match an output of the receiver of the first sub-array with an output of the receiver of the second sub-array by adjusting the receiver of the second sub-array.

12. The method of claim 11, wherein calibrating the waveform generator of the second sub-array comprises:
   adjusting the first and second switch assemblies to open the connection path between the first and second sub-arrays; and
   adjusting the waveform generator of the second sub-array to match the output of the receiver of the first sub-array with the output of the receiver of the second sub-array.

13. The method of claim 9, further comprising an initial operation of providing a wrap back path in each of the sub-assemblies which wraps a calibration signal from a transmit manifold of each of the first and second sub-arrays to a receive manifold of each corresponding one of the first and second sub-arrays via at least a portion of a transmit/receive module of each corresponding one of the first and second sub-arrays.

14. A system for calibrating waveform generators and receivers of non-overlapping electronic scanning antennas, the system comprising:
- a first sub-array including a first waveform generator, a first receiver, and a first switch assembly;
- a second sub-array including a second waveform generator, a second receiver, and a second switch assembly; and
- a calibration cable configured to selectably form a common calibration path between the first and second sub-arrays based on a position of the first and second switch assemblies,
- wherein the first and second switch assemblies are configured to enable calibration of the second receiver using an input from the first waveform generator via the calibration cable.

15. The system of claim 14, wherein the first switch assembly is configured to split a calibration signal generated by the first waveform generator between the first and second sub-arrays.

16. The system of claim 15, wherein the second switch assembly is selectable to switch between termination of a portion of the split calibration signal in a load and reflection of the portion of the split calibration signal back to the first sub-array to enable characterization of the common calibration path.

17. The system of claim 15, wherein the first and second switch assemblies are configured to enable calibrating the receiver of the second sub-array by utilizing the split calibration signal to match an output of the first receiver with an output of the second receiver by adjusting the second receiver.

18. The system of claim 17, wherein the first and second switch assemblies are configured to enable calibrating the second waveform generator by:
- adjusting the first and second switch assemblies to open the common calibration path between the first and second sub-arrays; and
- adjusting the second waveform generator to match the output of the second receiver with the output of the first receiver.

19. The system of claim 14, wherein the first sub-array further comprises a first transmit/receive module having a first wrap back path configured to wrap a calibration signal from a transmit manifold of the first sub-array to a receive manifold of the first sub-array and the second sub-array further comprises a second transmit/receive module having a second wrap back path configured to wrap a signal from a transmit manifold of the second sub-array to a receive manifold of the second sub-array.

20. The system of claim 19, wherein the first wrap back path includes an element for adjusting a phase shift of the calibration signal to enable balancing and equalizing the first receiver.

* * * * *